United States Patent
Celestina-Krevh

[11] Patent Number: 5,829,829
[45] Date of Patent: Nov. 3, 1998

[54] REMOVABLE/ADJUSTABLE HEAD SUPPORT

[75] Inventor: Maryann Celestina-Krevh, Euclid, Ohio

[73] Assignee: Graco Children's Products Inc., Elverson, Pa.

[21] Appl. No.: 944,086

[22] Filed: Oct. 2, 1997

Related U.S. Application Data

[63] Continuation of Ser. No. 738,385, Oct. 25, 1996, abandoned.

[51] Int. Cl.⁶ .................................................. A47C 31/00
[52] U.S. Cl. ............................... 297/219.12; 297/284.9; 5/655; 5/603; 5/637; 5/640
[58] Field of Search ........................... 297/219.12, 219.1, 297/229, 218.1, 230.14, 250.1, 256.11, 283.4, 283.8, 284.9, 284.3, 406, 485, 397; 5/655, 603, 637, 64

[56] References Cited

U.S. PATENT DOCUMENTS

| | | | |
|---|---|---|---|
| 3,174,163 | 3/1965 | Gibson | 5/640 |
| 5,056,522 | 10/1991 | Solano | 5/655 X |
| 5,310,245 | 5/1994 | Lyszczasz | 297/219.12 |
| 5,383,711 | 1/1995 | Houghteling | 5/640 X |
| 5,547,250 | 8/1996 | Childers | 297/219.12 X |
| 5,586,351 | 12/1996 | Ive | 297/219.12 X |

FOREIGN PATENT DOCUMENTS 1173209  12/1969  United Kingdom ................ 297/284.9

*Primary Examiner*—Laurie K. Cranmer
*Attorney, Agent, or Firm*—Knobbe, Martens, Olson & Bear, LLP

[57] ABSTRACT

An adjustable and removable head support for an infant and a toddler has an upper body portion with a pair of flanking pillow sections, a pair of harness belt apertures below the head pillow portions, a central portion with a plurality of fold lines and a lower portion with a pair of flanking leg pillow sections. The upper pillow sections are attached to the body portion by flexible securing straps provided at the top and bottom of each section. The lateral separation between the pillow head sections is adjusted by folding the pillow section about the upper and lower securing straps to either move the material inwardly or outwardly. The harness belt apertures are closed at the outboard edges thereof by means of suitable fasteners which can be disconnected to remove the support from the car seat.

5 Claims, 3 Drawing Sheets

REMOVABLE/ADJUSTABLE HEAD SUPPORT

This application is a continuation of application Ser. No. 08/738,385, filed Oct. 25, 1996, now abandoned.

BACKGROUND OF THE INVENTION

This invention relates to head supports for infants and toddlers. In particular, this invention relates to head supports especially adapted for use with a removable car seat designed to transport small infants and toddlers.

Removable head supports are known which are designed for use with children's safety car seats in order to provide cushioning support for the head of an infant or toddler. Some such supports are designed solely for small infants; others are designed for toddlers; and still others are intended for use with both. In general, the head support must be designed to be compatible with the various seat or harness belts associated with children's safety car seats, and ideally should be adaptable to the needs of a growing infant. In addition, some head supports are provided with a main body portion designed to provide additional cushioning support for the sides of the torso and legs of an infant or toddler or both.

A wide variety of such supports have been proposed in the past, with some fabricated solely from pliable fabric encasing appropriate padding while others utilize a cushioning material, such as a foam, in combination with a relatively stiffer backing material in order to provide a support base for the cushioning material. The invention is directed to an improvement over these prior art devices.

SUMMARY OF THE INVENTION

The invention comprises a head and lateral body support for use with child safety car seats which is adaptable to a growing infant, easily detachable from the car safety seat belts, relatively inexpensive to manufacture and easy to install and remove.

The support includes a pliant body member having an upper portion, a lower portion and a central portion. A first pair of laterally spaced adjustable pillow sections is attached to the upper portion of the pliant body member adjacent the outer edges thereof. Each of the pillow sections is attached to the pliant body member by means of upper and lower flexible straps so that the lateral position of a pillow section can be adjusted by merely folding the pillow section laterally under the upper and lower flexible straps.

A pair of belt openings is formed between the upper portion and the central portion of the pliant body member in order to accommodate the securing belts associated with the car safety seat. Closure means is provided for releasably securing the outer perimeter of each belt opening in order to encircle the belts and position the support in the car safety seat. The closure means preferably comprises a pair of releasable snap fasteners associated to the belt openings.

A second pair of laterally spaced pillow sections is attached to the lower portion of the pliant body member and each pillow section of the second pair extends along the edge portions of the lower portion of the pliant body member in order to provide cushioning support for the legs of an infant or child.

A plurality of fold seams extends laterally of the central portion of the pliant body member in order to provide a plurality of fold axes to assist in positioning the support in the car safety seat.

The invention provides an adjustable and removable head support for infants and toddlers which is relatively inexpensive to fabricate by sewing techniques, easy to install and remove and which is capable of adapting to the growing size of the child.

For a fuller understanding of the nature and advantages of the invention, reference should be made to the ensuing detailed description, taken in conjunction with the accompanying drawings.

DETAILED DESCRIPTION OF THE PREFERRED EMBODIMENTS

Figure 1:
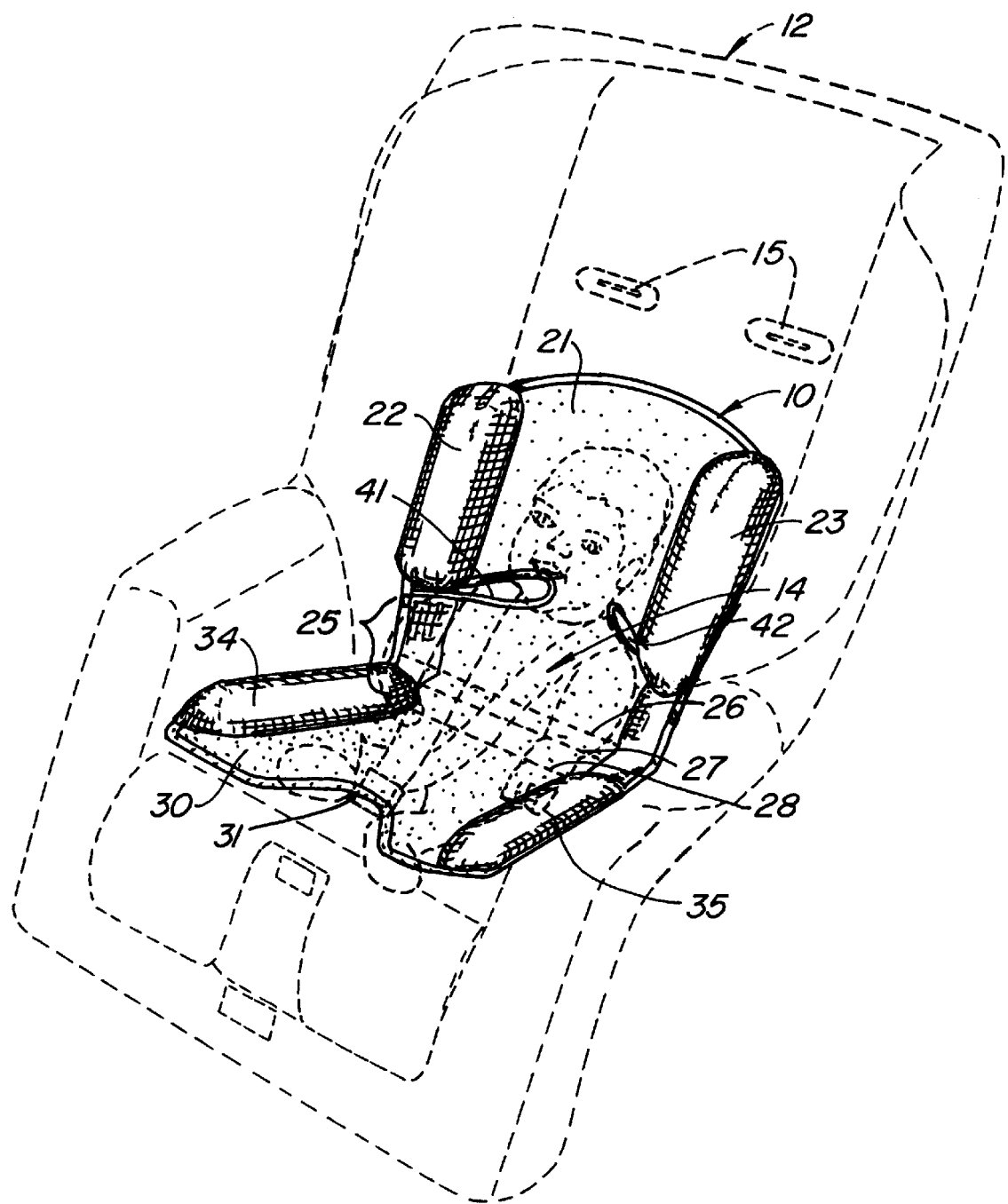
FIG. 1 is a perspective view illustrating the preferred embodiment of the invention in a first application for an infant.

Turning now to the drawings, FIG. 1 illustrates the preferred embodiment of the invention in a first configuration for use with an infant. As seen in this figure, the support generally designated with reference numeral 10 is arranged in a folded attitude in a known child's safety car seat illustrated in broken lines and generally designated with reference numeral 12. Seat 12 may comprise any one of several known devices designed for both rearward and forward facing installation in an automobile seat using the standard automobile seat belts. The child's safety car seat 12 is provided with a harness belt set shown in broken line and generally designated with reference numeral 14 which includes a pair of belts which pass over the shoulders of the infant (or toddler—see FIG. 2) and are secured to the child's safety car seat 12 in a suitable known fashion.

The harness belt system 14 typically passes through padded slots in the seat back portion of seat 12, such as slots 15 shown in FIG. 1. Typically, two or more sets of slots 15 are provided at vertical intervals along the seat back in order to accommodate infants and toddlers of different sizes. Thus, in FIG. 1 the harness belt system 14 is arranged to pass through the lowermost set of slots 15 (not illustrated) in order to accommodate the infant.

The support 10 includes an upper portion 21 flanked by a pair of generally vertically arranged pillow sections 22, 23, which provide cushioning support for the head of the infant from side to side. At the lower end of upper portion 21 is a central portion 25 preferably having three fold seams 26–28 extending horizontally thereacross.

Support 10 further includes a lower portion 30 having a central cut-out 31 provided to accommodate the lower attachment end of harness belt system 14, which is typically fastened to the forward portion of the cushion area of seat 12. Extending generally parallel to pillow sections 22, 23 but along lower portion 30 are a pair of additional pillow cushion sections 34, 35, which provide lateral support to the legs of the infant.

Extending inwardly from opposite edges of upper portion 21 just below the pillow sections 22, 23 are a pair of openings 41, 42, which enable the car seat harness belts to pass through the support 10, over the shoulders of the infant and downwardly to the connection point on the car seat cushion.

Figure 2:
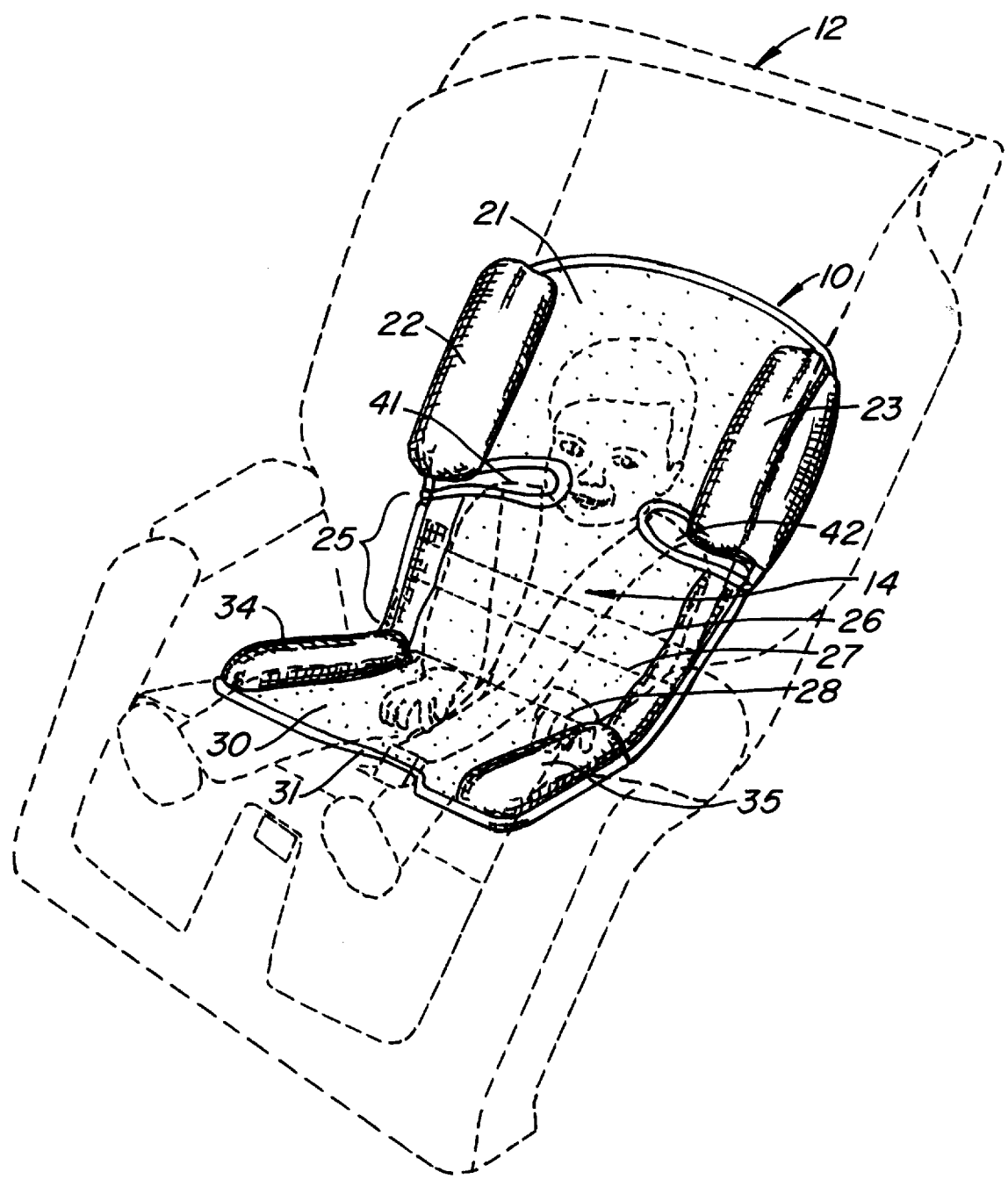
FIG. 2 is a view similar to FIG. 1 showing the invention adapted for use with a toddler.

FIG. 2 illustrates the invention in a different configuration for a toddler. As seen in this figure, the entire insert is repositioned upwardly of the back of car seat 12 so that the pillow sections 22, 23 remain located on either side of the head of the toddler. The harness belt system 14 is relocated to an upper pair of slots 15 to accommodate the longer torso of the toddler. In addition, the support 10 is now folded about lowermost fold seam 28, again to accommodate the longer torso of the toddler.

Figure 3:
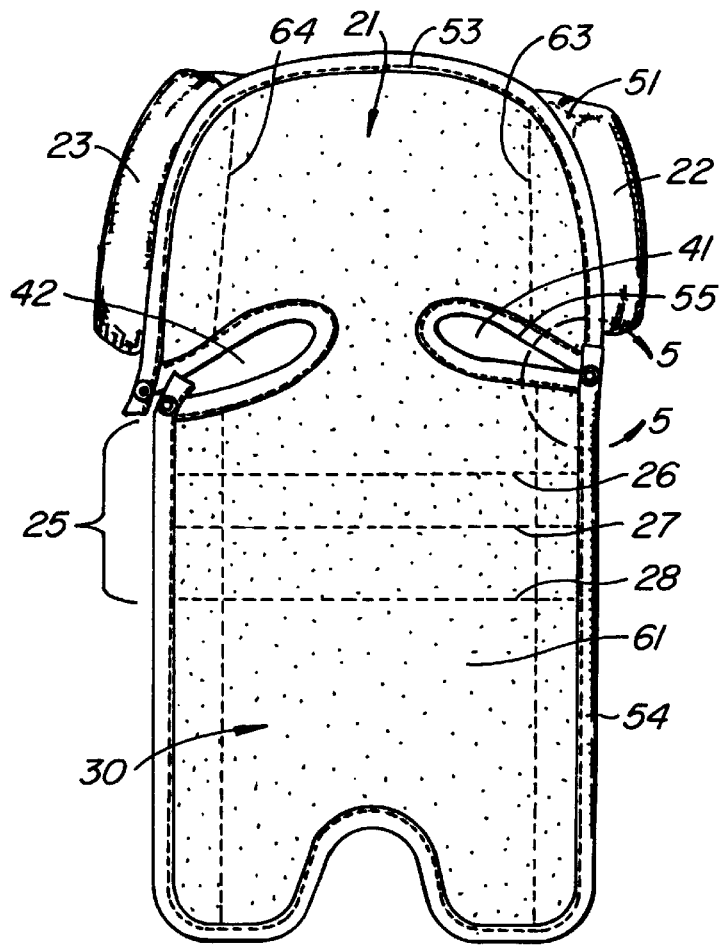
FIG. 3 is a rear plan view of the invention.
Figure 5:
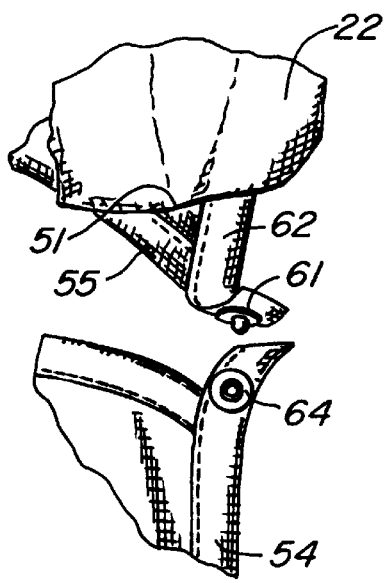
FIG. 5 is an enlarged detailed view illustrating the detaching mechanism of the invention.
Figure 4B:
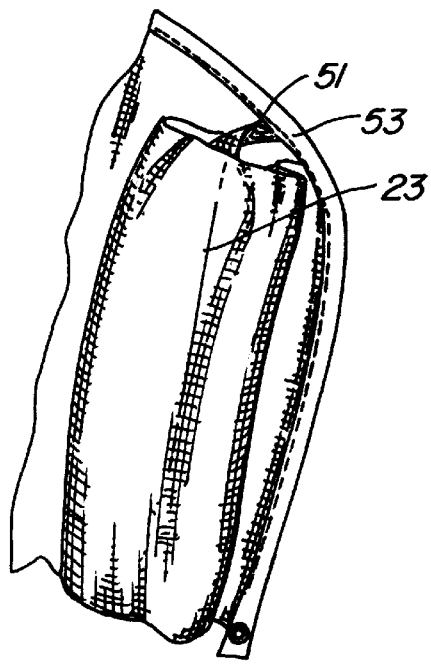
FIGS. 4A and 4B illustrate the head rest pillows in two different configurations.
Figure 4A:
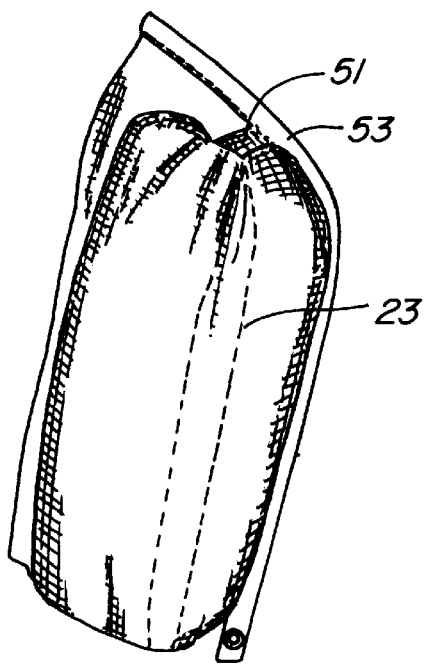

An important aspect of the invention is the easy adjustability of the head pillow sections 22, 23. Comparing FIGS. 1 and 2, it is evident that pillow sections 22, 23 are more closely spaced in the infant configuration shown in FIG. 1 than in the toddler configuration illustrated in FIG. 2. This is made possible by the manner in which the pillow portions 22, 23 are constructed and secured to upper portion 21 of support 10. With reference to FIGS. 3, 4A and 4B, each pillow section 22, 23 comprises a covering of thin pliable material such as polyester or cotton fabric forming an encasement for a suitable padding (not illustrated) such as a soft foam material. The pliant cover portion is secured to the upper portion 21 of insert 10 by means of upper and lower connecting straps 51. The upper connecting strap 51 is attached to the cover seam 53 of upper portion 21. As seen in FIG. 5, the lower connecting strap 51 is similarly connected to a cover seam 55 defining the harness belt opening 42.

The separation distance between the two head pillow portions 22, 23 is adjusted by simply maneuvering the encasement material and enclosed padding under the connecting straps 51 to either the fully inward position (illustrated in FIG. 4A) or the fully outward position (illustrated in FIG. 4B). This may be done by manipulating the material with the fingers of one hand either inwardly or outwardly of the connecting straps 51 (in the lateral direction). Thus, the pillow portions 22, 23 can be maneuvered to the narrow separation distance illustrated in FIGS. 1 and 4A for an infant, and to the relatively wider separation distance illustrated in FIGS. 2 and 4B for a toddler.

Another important feature of the invention resides in the ease of installation and removal of the support 10 from the car seat 12. The support 10 is held in place in the car seat 12 by means of the infant or toddler's body and the harness belt system 14, with the infant or toddler's body forcing the support 10 against the back and the cushion portion of car seat 12 under the force of the harness belt system 14, when attached. When installed, the individual belts of the harness belt system 14 pass through the belt apertures 41, 42. In order to maintain the support 10 in position in car seat 12, it is necessary that apertures 41, 42 be closed. However, it is not infrequently necessary to release the support 10 from the car seat 12 (e.g. when repositioning the harness belt system 14 or when cleaning the support 10). In order to facilitate installation and removal of the insert 10, a fastener mechanism is provided at the outboard side of each aperture 41, 42. As best seen in FIG. 5, in the preferred embodiment the fastener mechanism comprises a pair of mating snap fasteners: a male member 61 secured to a tail 62 of cover seam 53; and a female member 64 secured to a tail portion of a lower cover seam 54. In use, with the fasteners 61, 64 disconnected, the support 10 may be maneuvered onto car seat 12 and the belts of the harness belt system 14 can be slipped into the apertures 41, 42, after which fasteners 61, 64 are mutually connected. Removal is the reverse of installation.

The support 10 is constructed of pliant materials such as polyester or cotton fabric using standard sewing techniques.

As best seen in FIG. 3, the support 10 includes a one-piece backing 61, which preferably has a friction-providing surface texture to resist support 10 from sliding along the surface of car seat 12. The horizontal fold seams 26–28 are stitched through the support 10, and cover seams 53–55 are attached to the backing 61 and the front by stitching. Pillow sections 22, 23 are attached at one edge by stitching along lines 63, 64 and at the other edge by stitching along cover seam 53. Pillow sections 34, 35 (shown in FIGS. 1 and 2) are likewise attached at one edge by stitching along lines 63, 64 and at the other edge by stitching along cover seam 54. Pillow sections 34, 35 are formed of pliant fabric, like pillow sections 22, 23, filled in the region below fold seam 28 with a padding material. The upper lengths of pillow sections 34, 35 are provided with a smaller amount of padding to promote folding about fold seams 26–28.

As will now be apparent, the invention provides an adjustable and removable head support for infants and toddlers which is relatively inexpensive to fabricate, easy to install and remove and which is capable of adapting to the growing size of the child. In particular, the head pillow portions 22, 23 may be adjusted in the manner noted to provide a smaller or wider spacing therebetween; while the point at which the central portion of the support is folded is selectable at different vertical intervals.

While the above provides a full and complete disclosure of the preferred embodiments of the invention, various modifications, alternate constructions and equivalents may be employed, as desired. For example, while three fold lines 26–28 have been illustrated, more fold lines may be provided, if desired. In addition, while snap fasteners 61, 64 have been described and illustrated, other types of fasteners may be employed, as desired. Therefore, the above description and illustrations should not be construed as limiting the scope of the invention, which is defined by the appended claims.

What is claimed is:

1. A support for use with a car safety seat having securing belts, said support comprising:

a pliant body member having an upper portion, a lower portion and a central portion;

a first pair of laterally spaced generally vertically aligned adjustable pillow sections, each pillow section having an outer edge attached to an outer edge of the upper portion of said body member and an inner edge attached to the upper portion of said body member at a location inboard of said outer edge; and two pairs of upper and lower flexible straps, each pair associated to a different one of said pair of adjustable pillow sections, each of said pairs of straps having one end attached to said upper portion of said body member at a location spaced from said outer edge and its other end attached to the associated one of said pair of adjustable pillow sections at a location spaced from said one edge, the upper flexible strap being attached to an upper portion of the associated pillow section and the lower flexible strap being attached to a lower portion of the associated pillow section, so that the lateral position of each pillow section can be adjusted by folding the pillow section under the upper and lower flexible straps to provide greater space between said pair of pillow sections than when said pillow sections are not folded under the upper and lower flexible straps.

2. The apparatus of claim 1 further including a pair of belt openings formed between said upper portion and said central portion, and closure means for releasably securing the outer perimeter of said belt opening to encircle the belts and position the support in the car safety seat.

3. The apparatus of claim 2 wherein said closure means comprises a pair of releasable fasteners associated to said belt openings.

4. The apparatus of claim 1 further including a second pair of laterally spaced pillow sections attached to said lower portion of said pliant body member and extending along the edge portions thereof.

5. The apparatus of claim 1 further including a plurality of fold seams extending laterally of said central portion of said pliant body member for providing a plurality of fold axes for said pliant body member.

* * * * *